United States Patent [19]
Lo et al.

[11] Patent Number: 6,031,298
[45] Date of Patent: Feb. 29, 2000

[54] 2N REDUNDANT POWER SYSTEM AND METHOD USING CROSS-COUPLED AC POWER TRANSFER

[75] Inventors: Kirk Earnshaw Ming-Teh Lo, Louisville; Timothy Craig Groat, Berthoud, both of Colo.

[73] Assignee: International Business Machines Corporation, Armonk, N.Y.

[21] Appl. No.: 08/994,201

[22] Filed: Dec. 19, 1997

[51] Int. Cl.[7] .................................................. H02J 7/00
[52] U.S. Cl. .................. 307/64; 307/44; 307/45
[58] Field of Search ................................. 307/43, 44, 45, 307/46, 64, 66, 80, 82, 85, 86, 87

[56] References Cited

U.S. PATENT DOCUMENTS

| | | |
|---|---|---|
| 4,010,381 | 3/1977 | Fickenscher et al. . |
| 4,090,090 | 5/1978 | Johnston . |
| 4,096,395 | 6/1978 | Bogel et al. . |
| 4,231,029 | 10/1980 | Johnston . |
| 4,384,213 | 5/1983 | Bogel . |
| 4,405,867 | 9/1983 | Moakler et al. . |
| 4,761,563 | 8/1988 | Ross et al. . |
| 5,138,184 | 8/1992 | Keefe ........................................ 307/64 |
| 5,146,386 | 9/1992 | Learned . |
| 5,386,147 | 1/1995 | Bonneau et al. ........................ 307/64 |
| 5,473,528 | 12/1995 | Hirata et al. ............................. 307/66 |
| 5,559,376 | 9/1996 | Tachikawa ............................... 307/86 |
| 5,623,596 | 4/1997 | Townsley et al. . |
| 5,668,417 | 9/1997 | Wiscombe et al. ...................... 307/64 |
| 5,729,059 | 3/1998 | Kilroy et al. ............................. 307/84 |
| 5,768,117 | 6/1998 | Takahashi et al. ....................... 307/82 |
| 5,814,904 | 9/1998 | Galm ....................................... 307/130 |
| 5,834,856 | 11/1998 | Tavallaei et al. ......................... 307/64 |

*Primary Examiner*—Jeffrey Gaffin
*Assistant Examiner*—Peter Zura
*Attorney, Agent, or Firm*—Altera Law Group, LLC

[57] ABSTRACT

A 2N redundant power system and method is disclosed that uses cross-coupled AC power transfer. Two cross-coupled AC Transfer switches always connect power converting hardware to an active AC source so that the 2N redundant power system prevents changes in the operating conditions when the loss of one AC source occurs. The system includes a first power source for providing power to a load through a first branch, a second power source for providing power to the load through a second branch and a pair of AC transfer switches cross-coupling the first power source to the second branch when a failure to the second power source is detected, and vice versa. A first and second contactor arrangement each include a first contactor and a second contactor connected in series. A control circuit includes a first coil system for controlling the first contactor arrangement, a second coil system for controlling the second contactor arrangement, and a coil system selection circuit. The coil system selection circuit includes a relay system for connecting the first or second coil system to ground to activate either the first or the second coil system, and a primary source failure detection circuit for detecting a failure of the primary power source and activating the second coil system in response thereto. The primary source failure detection circuit further includes a connection deriving power from the primary power source, a delay circuit for delaying a failure identification signal, and a relay coil system for receiving the failure activation signal to activate the second coil system.

16 Claims, 3 Drawing Sheets

2N REDUNDANT POWER SYSTEM AND METHOD USING CROSS-COUPLED AC POWER TRANSFER

BACKGROUND OF THE INVENTION

1. Field of the Invention.

This invention relates in general to a redundant power supply system, and more particularly to a 2N redundant power system and method using cross-coupled AC power transfer.

2. Description of Related Art.

Modern-day communication and computer equipment utilize solid state integrated circuits technology to transmit and control data and switching information. Circuits utilizing solid state integrated circuit technology are highly susceptible to variations in electric power from some desired standard. The power to energize these circuits can be readily derived from commercial AC power. The signal consistency of commercial AC power, however, is unreliable due to user demand and other extraneous considerations causing power level fluctuations. These signal variations can take the form of blackouts, brownouts, or transient interruptions or surges. Power outages that extend for a long period of time, on the order of seconds and longer, can render computer peripheral equipment as unavailable.

Typical subsystems are designed to ride through power outages that last up to 20 milliseconds. If the subsystem is designed for battery backup, the system can continue to operate for several minutes before the unit shuts off due to the batteries discharging. Unfortunately, some power outages can last for an extended period of time beyond the holdup capabilities of the batteries. Therefore, customers have required subsystems that are designed to accommodate two separate incoming power line cords. With two separate incoming power line cords, in the event of a power loss on one power cord, the second power cord will deliver the necessary power to keep the subsystem operational. The main reason for this requirement is that customers want the most reliable equipment that they can get due to the high costs, to the customer, associated with the subsystem being down.

Previous designs have also provided increased fault tolerance. To overcome the problems with the single power line cord, subsystems have been designed with a 2N power system. In other words, each power line cord would have its own separate power system. Therefore, in the event of a power outage on one line cord, the second line cord's power system is capable of powering the entire subsystem.

A 2N redundant power system is a system having two power line cords per load, wherein each powerline cord has its own power system, i.e., twice the reliability. Thus, in the event of a power failure on one line cord, the second line cord's power system powers the entire system. In a 2N redundant power system, the loss of one AC sources increases the stress levels on the power supplies by 100%. Also, the load must be kept within a specified temperature range. To accomplish this, cooling devices are used. If AC cooling devices are used, the increase of stress levels is even more drastic since the AC cooling devices must also be powered by the second line cord in event of a failure to the first power line cord. This reduces reliability and forces severe de-rating of components. It can be seen that there is a need for two cross-coupled AC Transfer switches that always connect power converting hardware to an active AC source.

It can also be seen that there is a need for a 2N redundant power system that prevent changes in the operating conditions when the loss of one AC source occurs.

SUMMARY OF THE INVENTION

To overcome the limitations in the prior art described above, and to overcome other limitations that will become apparent upon reading and understanding the present specification, the present invention discloses a 2N redundant power system and method using cross-coupled AC power transfer.

The present invention solves the above-described problems by providing two crosscoupled AC Transfer switches that always connect power converting hardware to an active AC source so that a 2N redundant power system prevents changes in the operating conditions when the loss of one AC source occurs.

A system in accordance with the principles of the present invention includes a first power source for providing power to a load through a first branch, a second power source for providing power to the load through a second branch and a pair of AC transfer switches cross-coupling the first power source to the second branch when a failure to the second power source is detected and the second power source to the first branch when a failure to the first power source is detected.

Other embodiments of a system in accordance with the principles of the invention may include alternative or optional additional aspects. One such aspect of the present invention is that each of the AC transfer switches include a first contactor arrangement for connecting a primary source to the load, a second contactor arrangement for connecting a redundant power source to the load, and a control circuit for controlling the setting of the first and second contactor arrangements to select between the primary and redundant power source.

Another aspect of the present invention is that the primary power source is the first power source and the redundant power source is the second power source when the AC transfer switch is disposed in the first branch.

Another aspect of the present invention is that the primary power source is the second power source and the redundant power source is the first power source when the AC transfer switch is disposed in the second branch.

Another aspect of the present invention is that the first and second contactor arrangement each include a first contactor and a second contactor connected in series.

Yet another aspect of the present invention is that the control circuit includes a first coil system for controlling the first contactor arrangement, a second coil system for controlling the second contactor arrangement, and a coil system selection circuit.

Another aspect of the present invention is that the coil system selection circuit includes a relay system for connecting the first or second coil system to ground to activate either the first or the second coil system, and a primary source failure detection circuit for detecting a failure of the primary power source and activating the second coil system in response thereto.

Another aspect of the present invention is that the primary source failure detection circuit further includes a connection deriving power from the primary power source, a delay circuit for delaying a failure identification signal, and a relay coil system for receiving the failure activation signal to activate the second coil system.

Another aspect of the present invention is that the first and second power sources include a first and second AC power source.

Still another aspect of the present invention is that the first AC power source provides power to the load by driving a first AC-to-DC converter.

Another aspect of the present invention is that the second AC power source provides power to the load by driving a second AC-to-DC converter.

Another aspect of the present invention is that the system further includes a first air mover coupled to the first branch for cooling the load and a second air mover coupled to the second branch for cooling the load.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a 2N redundant power system and method using cross-coupled AC power transfer.

Figure 1:
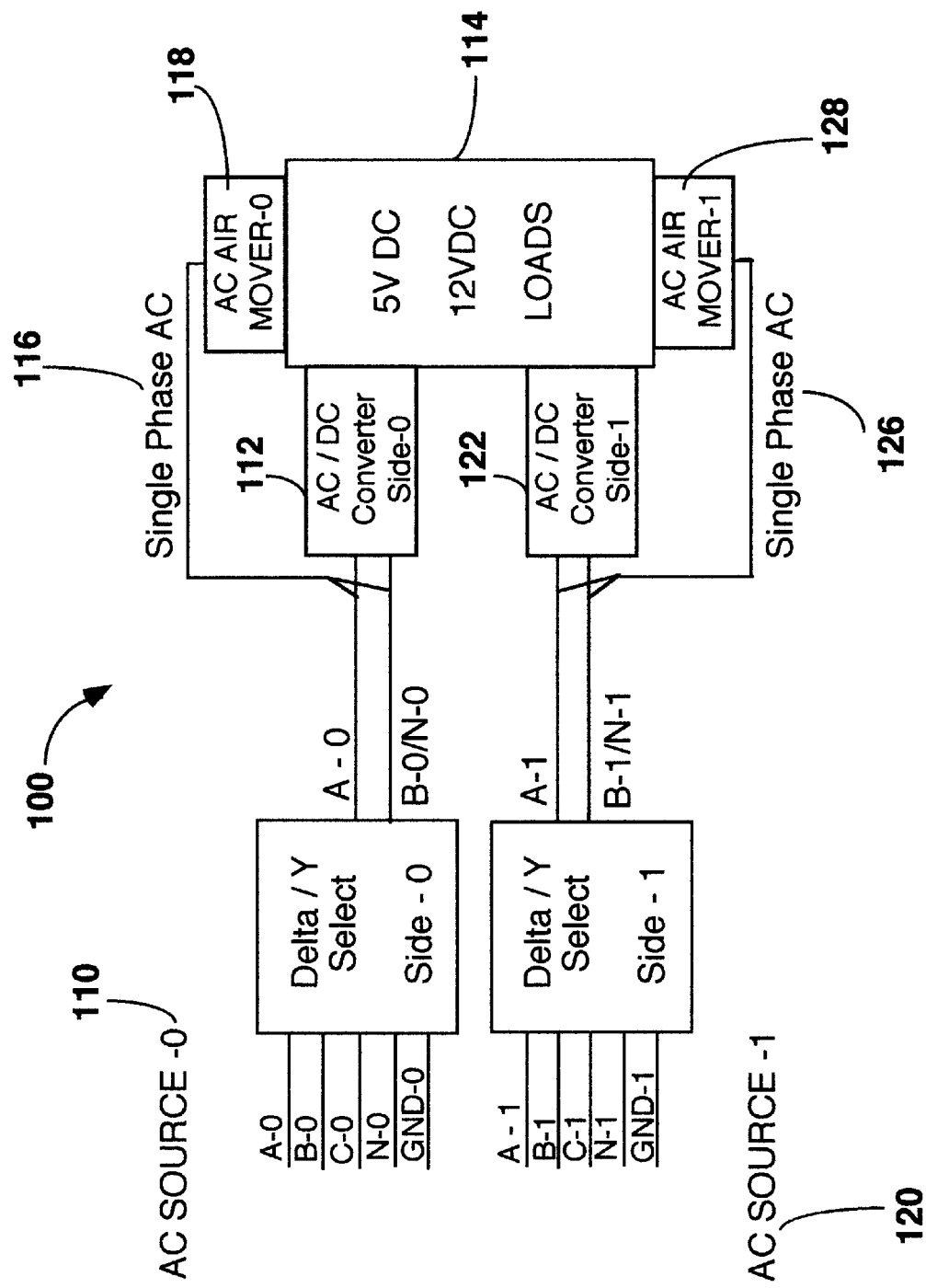
FIG. 1 illustrates a block diagram of a 2N redundant fire system.

FIG. 1 illustrates a block diagram of a 2N redundant power system 100. In FIG. 1, a first AC source 110 supplies electrical power to a first AC to DC converter 112 which drives, for example, 5 volt DC and 12 volt DC loads 114. From the first AC source 110, a single phase AC supply line 116 is routed to an AC air mover 118.

To provide 2N redundancy, a second AC source 120 is provided. The second AC source 120 provides AC power to a second AC to DC converter 122. The second AC to DC converter 122 drives the 5 volt DC and 12 volt DC loads 114. In addition, a single-phase AC line 126 is routed from the second AC source 120 to a second AC air mover 128.

The 2N redundant power system shown in FIG. 1 may experience increased stress levels on the power supplies when one of the AC sources fails. Due to the AC cooling devices, increase in stress level is even more drastic. The added stress levels reduce reliability and force derating of components.

Figure 2:
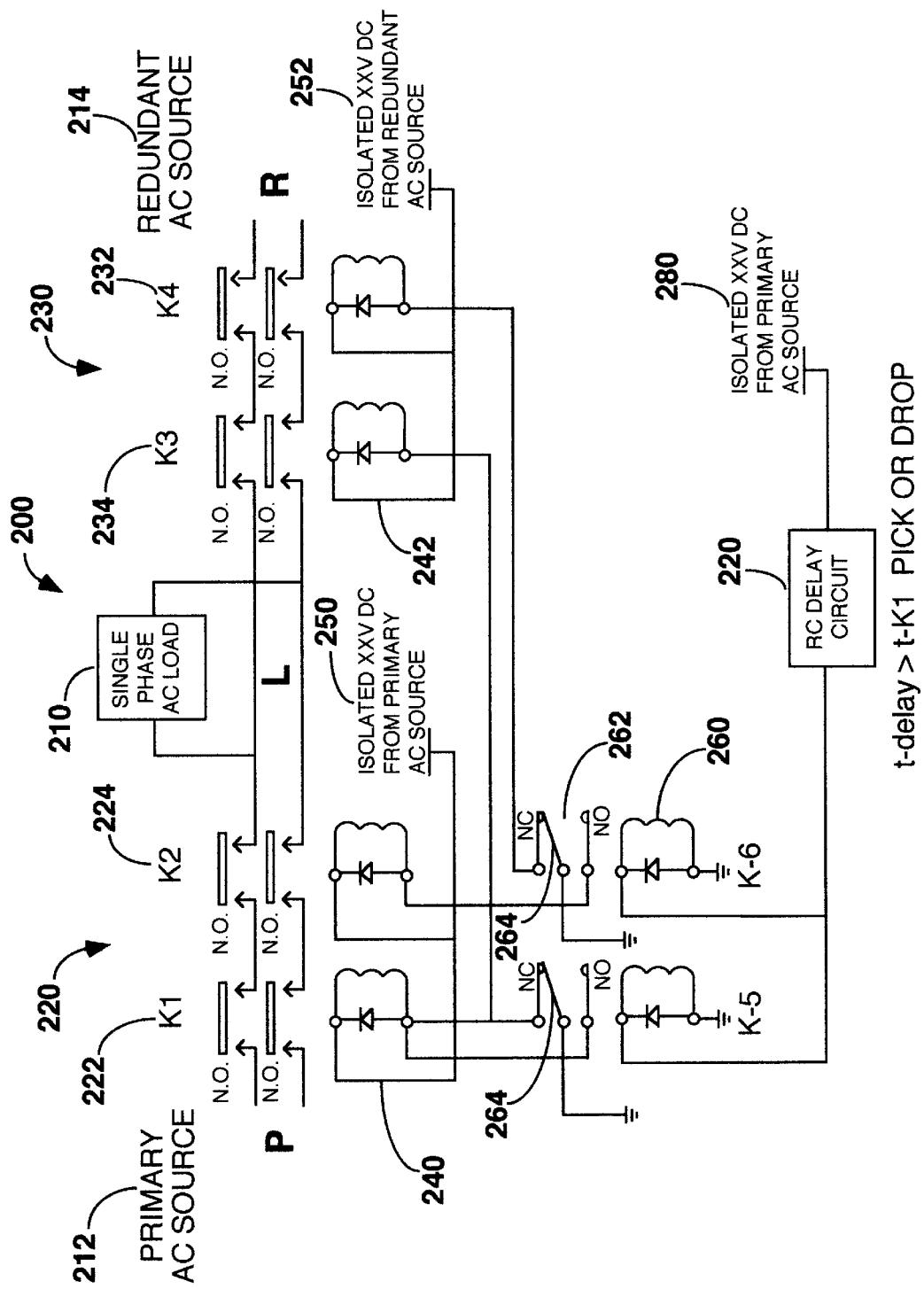
FIG. 2 illustrates a schematic diagram of a single-phase AC transfer switch.

FIG. 2 illustrates a schematic diagram of a single-phase AC transfer switch 200. In FIG. 2, a single-phase AC load 210 may be powered by either primary AC source 212 or redundant AC source 214. However, the single-phase AC transfer switch 200 automatically powers the single-phase AC load 210 with the primary AC source 212 unless a failure to the primary AC source 212 occurs. Primary AC source 212 is provided to the single-phase AC load 210 through a contactor arrangement 220. Contactor arrangement 220 includes a front contactor 222 and a rear contactor 224. The spacing for the series contactors is chosen to meet recommended product safety requirements. Similarly, redundant AC source 214 is provided to the single-phase AC load 210 through contact arrangement 230. Contact arrangement 230 includes a front contactor 232 in series with a rear contactor 234.

Coils 240 control contact arrangement 220 and coils 242 control contactor arrangement 230. Coils 240 are connected to an isolated 12 volt DC supplied from the primary AC source 250. Coils 242 are connected to an isolated 12 volt DC source from the redundant AC source 252. Contactor control coils 260 control whether the primary AC source 212 or the redundant AC source 214 is provided to the single-phase AC load 210. Control of the contactor coils 240 and 242 is provided by contactor coil control coils 260 which control relays 262. The selection of activating coils 240 or coil 242 is implemented by connecting either coil 240 or coil 242 to ground using the wiper 264 of relays 262. Normally, wipers 264 are connected to coils 240 to activate contactor arrangement 220, thereby providing primary AC source 212 to the single-phase load 210. This is because coils 260 are controlled through the RC delay circuit 270 by an isolated 12 volt DC source from the primary AC source 280. Thus, while the primary AC source 212 is functioning properly, coils 260 ensure that contactor arrangement 220 is closed and contactor arrangement 230 is open. However, whenever a failure in the primary AC source 212 occurs, the isolated 12 volt DC voltage from the primary AC source also fails and the RC delay circuit holds the voltage at coils 260 for a predetermined time delay before coils 260 change the positions of wipers 264 to activate coils 242, thereby closing contactor arrangement 230 and open contactor arrangement 220. This disengages primary AC source 212 from the single-phase AC load 210 and engages the redundant AC source 214 with the single-phase AC load 210.

Figure 3:
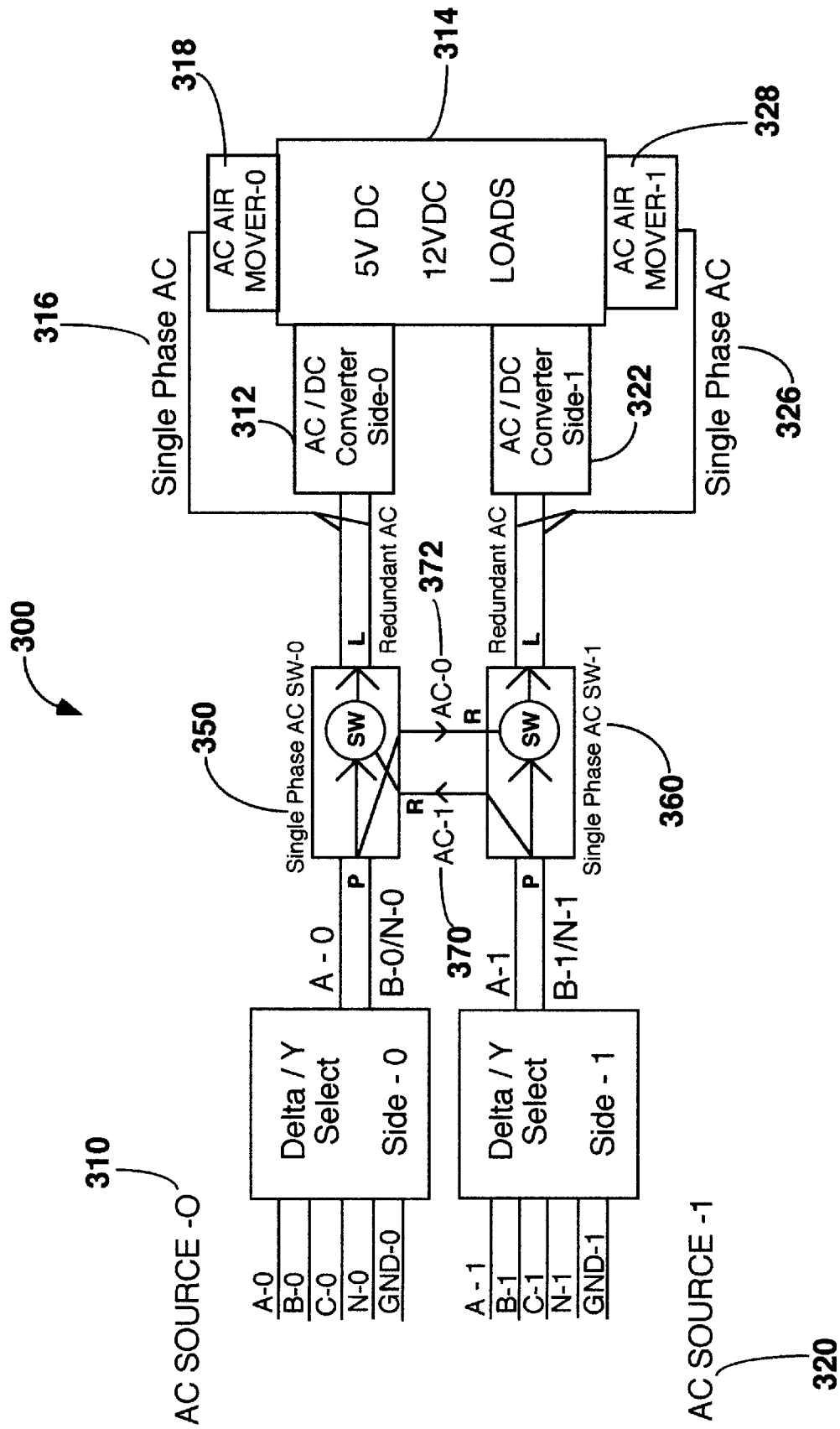
FIG. 3 illustrates a block diagram of a 2N redundant power system using 2N AC transfer switches according to the invention.

FIG. 3 illustrates a block diagram of a 2N redundant power system using 2N AC transfer switches 300 according to the invention. In FIG. 3, a first AC source 310 is connected through a first single-phase AC transfer switch 350 to a first AC to DC converter 312 which provides, for example, 5 volt DC and 12 volt DC power to loads 314. A single-phase AC line is routed from the output of the first single-phase AC transfer switch 350 to the first AC air mover 318.

Similarly, the second AC source 320 is connected through a second single-phase AC transfer switch 360 to a second AC to DC converter 322 which also provides 5 volt DC and 12 volt DC power to load 314. A second single-phase AC line 326 is routed from the output of the second single-phase AC transfer switch 360 to the second AC air mover 328. The first AC to DC converter 312 normally runs from the first AC source 310. Likewise, the second AC to DC converter 322 normally runs from the second AC source 320. Further, each converter 312, 322 is capable of powering the entire DC load 314. Thus, the first 310 and second 320 AC sources are redundant. However, the first single-phase AC transfer switch 350 is cross-coupled with the second single-phase transfer switch 360. Thus, AC is cross-couple transferred to the two branches of the power system to provide power to both the first 312 and second 322 AC to DC converter and to the first 318 and second 328 AC air movers. For example, when the first AC source 310 fails, the second AC source 320 provides a redundant power source lead 370 to the first single-phase AC transfer switch 350. The first single-phase AC transfer switch automatically determines that a failure has occurred to the first AC source 310, and switches to the redundant power source 370 to provide power to the first AC to DC converter 312 and first AC air mover 318. Similarly, a redundant power source 372 is provided to the second single-phase AC transfer switch 360 from the first AC source 310. Thus, when the second AC source 320 fails, the second single-phase AC transfer switch 360 switches the redundant power source 372 from the first AC source 310 to provide power to the second AC to DC converter 322 and second AC air mover 328. Accordingly, when one AC source goes down, the converter normally attached to that source is switched to the other source. During the transfer time, the DC load 314 is held up by the converter that is not affected by the power failure. Only one converter is switched at a time and the transfer time is not critical. Further, there are no single points of failure and all parts can be replaced on-line.

By using two cross-coupled AC Transfer switches, power converting hardware is always connected to an active AC source. Thus, the 2N redundant power system prevents changes in the operating conditions when the loss of one AC source occurs. The 2N redundant power system uses cross-coupled AC power transfer to reduce electrical stress level of power supply components under fault conditions. In this manner, uniform cooling of all machine components under fault or normal conditions may be maintained. Thus, increased system reliability is provided and higher system packaging density may be obtained.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A redundant power system, comprising:
   a first power source for providing AC power,
   a first AC to DC converter for converting AC power in a first branch to DC power; the DC power from the first AC to DC converter being used to drive a load;
   a second power source for providing AC power;
   a second AC to DC converter for converting AC power in a second branch to DC power, the DC power from the second AC to DC converter being used to drive the load; and
   a pair of AC transfer switches cross-coupling the first AC power source to the second AC to DC converter in the second branch when a failure to the second AC power source is detected and the second AC power source to the first AC to DC converter in the first branch when a failure to the first AC power source is detected.

2. The redundant power system of claim 1 wherein each of the AC transfer switches comprise a first contactor arrangement for connecting a primary source to the load, a second contactor arrangement for connecting a redundant power source to the load, and a control circuit for controlling the setting of the first and second contactor arrangements to select between the primary and redundant power source.

3. The redundant power system of claim 2 wherein the primary power source is the first AC power source and the redundant power source is the second AC power source when the AC transfer switch is disposed in the first branch.

4. The redundant power system of claim 3 wherein the primary power source is the second AC power source and the redundant power source is the first AC power source when the AC transfer switch is disposed in the second branch.

5. The redundant power system of claim 2 wherein the primary power source is the second AC power source and the redundant power source is the first AC power source when the AC transfer switch is disposed in the second branch.

6. The redundant power system of claim 2 wherein the first and second contactor arrangement each comprise a first contactor and a second contactor connected in series.

7. The redundant power system of claim 2 wherein the control circuit comprises a first coil system for controlling the first contactor arrangement, a second coil system for controlling the second contactor arrangement, and a coil system selection circuit.

8. The redundant power system of claim 7 wherein the coil system selection circuit comprises a relay system for connecting the first or second coil system to ground to activate either the first or the second coil system, and a primary source failure detection circuit for detecting a failure of the primary power source and activating the second coil system in response thereto.

9. The redundant power system of claim 8 wherein the primary source failure detection circuit further comprises a connection deriving power from the primary power source, a delay circuit for delaying a failure identification signal, and a relay coil system for receiving the failure activation signal to activate the second coil system.

10. The redundant power system of claim 1 further comprising a first air mover coupled to the first branch for cooling the load and a second air mover coupled to the second branch for cooling the load.

11. A method of providing a redundant power system, comprising the steps of:
    providing AC power from a first AC power source;
    converting AC power to DC power in a first branch to drive a load;
    providing AC power from a second AC power source;
    converting AC power to DC power in a second branch to drive the load; and
    cross-coupling the first AC power source to the second branch when a failure to the second AC power source is detected and the second AC power source to the first branch when a failure to the first AC power source is detected.

12. The method of claim 11 wherein the step of cross-coupling comprises the steps of connecting a primary source through a first contactor arrangement in an AC transfer switch, connecting a redundant power source through a second contactor arrangement in the AC transfer switch, and controlling the setting of the first and second contactor arrangements to select between the primary and redundant power source, the primary power source being the first AC power source and the redundant power source being the second AC power source when the AC transfer switch is disposed in the first branch and the primary power source being the second AC power source and the redundant power source being the first AC power source when the AC transfer switch is disposed in the second branch.

13. The method of claim 12 wherein the first and second contactor arrangement each comprise a first contactor and a second contactor connected in series.

14. The method of claim 12 wherein the step of controlling the setting of the first and second contactor arrangements comprises the steps of controlling the first contactor arrangement with a first coil system, controlling the second contactor arrangement with a second coil system, and selecting the activation of the first or second coil system.

15. The method of claim 14 wherein the step of selecting the activation of the first or second coil system comprises the steps of connecting the first or second coil system to ground using a relay system to activate either the first or the second coil system, detecting a failure of the primary power source and activating the second coil system and deactivating the first coil system in response to the detecting of a failure of the primary power source.

16. The method of claim 15 wherein the step of detecting a failure of the primary power source further comprises the steps of deriving power from the primary power source, delaying a failure identification signal when the derived power dissipates, and sending the failure identification signal to the relay system to activate the second coil system and deactivate the first coil system.

* * * * *